(12) United States Patent
Tanaka et al.

(10) Patent No.: US 7,349,757 B2
(45) Date of Patent: Mar. 25, 2008

(54) NC HOLE-MACHINING PROGRAMMING DEVICE AND METHOD

(75) Inventors: Katsunori Tanaka, Tokyo (JP); Susumu Matsubara, Tokyo (JP); Yoshiyuki Hattori, Tokyo (JP); Hiroyoshi Imazu, Tokyo (JP); Takashi Kamiya, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/256,192

(22) Filed: Oct. 24, 2005

(65) Prior Publication Data

US 2006/0106486 A1 May 18, 2006

(30) Foreign Application Priority Data

Nov. 16, 2004 (JP) ............................. 2004-331865

(51) Int. Cl.
 *G06F 19/00* (2006.01)
(52) U.S. Cl. .................. 700/186; 700/86; 700/118; 700/182; 318/568.1
(58) Field of Classification Search ............. 700/86, 700/118, 182, 186; 318/568.1
 See application file for complete search history.

(56) References Cited

U.S. PATENT DOCUMENTS

| | | | |
|---|---|---|---|
| 5,115,400 A * | 5/1992 | Watanabe et al. | ............ 700/182 |
| 5,815,400 A | 9/1998 | Hirai et al. | |
| 6,047,225 A * | 4/2000 | Iriguchi et al. | ............. 700/187 |
| 6,266,572 B1 * | 7/2001 | Yamazaki et al. | ............ 700/96 |
| 6,356,799 B1 * | 3/2002 | Takegahara et al. | ........ 700/182 |
| 2003/0130758 A1 | 7/2003 | Hirano et al. | |

FOREIGN PATENT DOCUMENTS

| | | |
|---|---|---|
| JP | 06-170692 | 6/1994 |
| JP | 7-276185 | 10/1995 |
| JP | 11-85239 | 3/1999 |
| JP | 2003-177811 A | 6/2003 |

* cited by examiner

*Primary Examiner*—Kidest Bahta
*Assistant Examiner*—Sheela Rao
(74) *Attorney, Agent, or Firm*—Leydig, Voit & Mayer, Ltd.

(57) ABSTRACT

A numerical control (NC) hole-machining programming device includes: a tool information storing unit for storing tool information, including types and sizes of tools used for hole machining; a form recognizing unit for extracting a cylindrical surface and conical surface as a local geometry which constitutes a hole-machining form of target objects based on CAD data; a machining method determining unit which generates a hole-machining-form pattern based on the hole-machining form detected by the form recognizing unit and determines machining methods based on the hole-machining-form pattern; a tool determining unit for selecting a tool in accordance with the machining methods determined by the machining method determining unit with reference to the tool information; a tool path determining unit which determines a tool path for each tool selected by the tool determining unit; and an NC program generating unit which generates an NC program based on the tool paths determined by the tool path determining unit.

6 Claims, 9 Drawing Sheets

| feature of local contour | identifier |
|---|---|
| cylinder | c |
| cylinder (screw thread) | C |
| cylinder (reamer) | R |
| cone | t |
| cone (chamfer) | o |
| cone (screw thread) | T |
| ... | ... |

| hole-machining-form pattern | machining method |
|---|---|
| c | drilling |
| oc | |
| ct | |
| oct | |
| C | tapping |
| T | |
| oC | |
| Ct | |
| oT | |
| Tc | |
| oCt | |
| oTc | |
| oTct | |
| R | reaming |
| oR | |
| Rt | |
| Rc | |
| oRt | |
| oRc | |
| oRct | |
| cc | stepped-hole machining |
| occ | |
| cct | |
| occt | |
| ... | ... |

NC HOLE-MACHINING PROGRAMMING DEVICE AND METHOD

FIELD OF THE INVENTION

The present invention relates to devices for generating NC programs for hole machining, and particularly to a device for automatically generating numerical control (NC) programs for hole machining based on CAD data.

BACKGROUND OF THE INVENTION

An NC hole-machining programming device disclosed in Japanese Laid-Open Patent Publication 170692/1994 detects a chamfering shape included in the hole-machining forms from CAD data, and determines a hole machining method based on the detected chamfering shape. The above publication describes that a hole machining method is selected according to data indicating internal diameter and depth of a hole, and the chamfered shape formed on the opening edge of the hole, included in the CAD data of hole-machining forms. For instance, drilling is selected as a machining method for a hole with no chamfer, and drilling and reaming is selected for a hole with a chamfer. Then, a tool type, a drill or a reamer, is determined in accordance with the selected hole machining method.

Since conventional NC hole-machining programming device selects a hole machining method based on a chamfer and a chamfering angle, they are not capable of handling various types of hole machining such as tapping or complicated hole-machining forms.

The present invention has been made to solve above problems. A first object of this invention is to provide an NC hole-machining programming device that can deal with various hole machining such as tapping and stepped-hole machining, as well as drilling or reaming.

A second object of the invention is to provide an NC hole-machining programming device that can deal with complicated hole-machining forms.

SUMMARY OF THE INVENTION

An NC hole-machining programming device according to this present invention includes: a tool information storing unit for storing tool information including types and sizes of tools used for hole machining; a form recognizing unit for extracting a cylindrical surface and conical surface as a local geometry which constitutes a hole-machining form of target objects based on CAD data; a machining method determining unit which generates a hole-machining-form pattern based on the hole-machining form detected by the form recognizing unit and determine machining methods based on the hole-machining-form patterns; a tool determining unit for selecting a tool in accordance with the machining methods determined by the machining method determining unit with reference to the tool information; a tool path determining unit which determines a tool path for each tool selected by the tool determining unit; and an NC program generating unit which generates a NC programs based on the tool paths determined by the tool path determining unit.

DETAILED DESCRIPTION OF THE PREFERRED EMBODIMENTS

Figure 1:
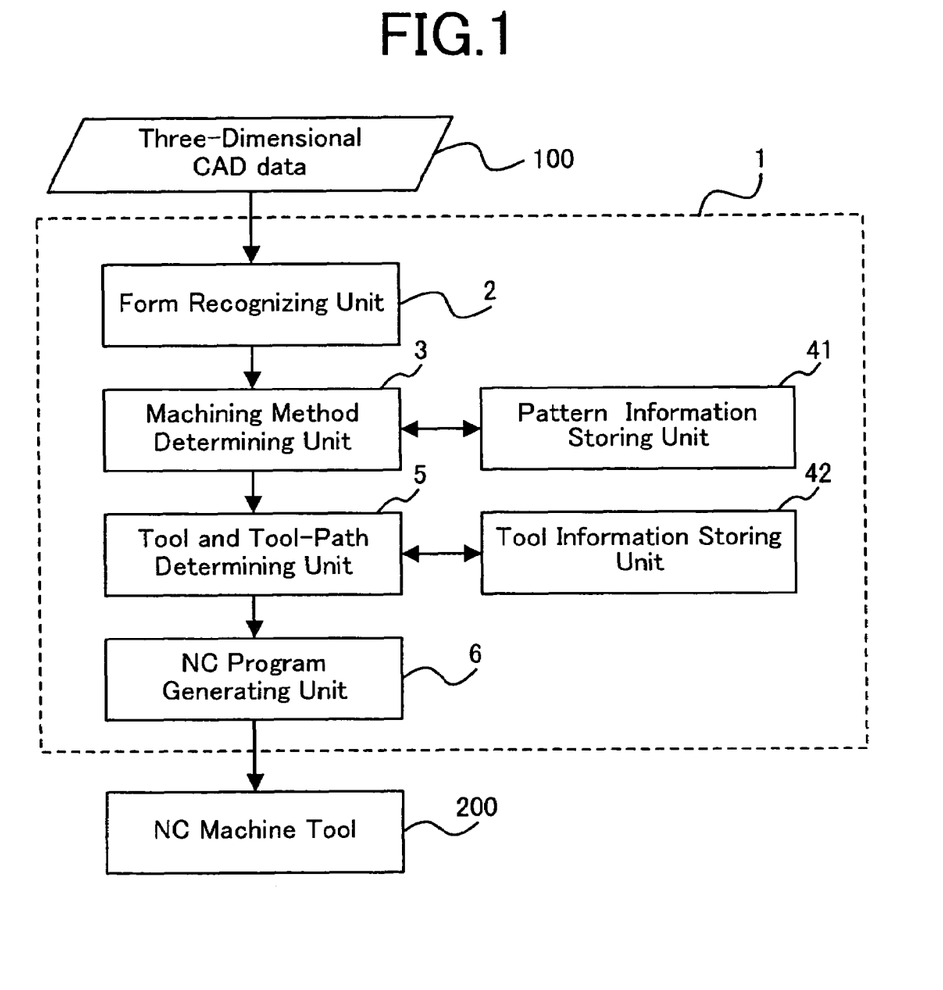
FIG. 1 is a block diagram illustrating an embodiment of an NC hole-machining programming device according to the present invention.

FIG. 1 is a block diagram illustrating a configuration of an NC hole-machining programming device according to the present invention. The NC hole-machining programming device 1 illustrated in FIG. 1 includes a form recognizing unit 2, a machining method determining unit 3, a pattern information storing unit 41, a tool information storing unit 42, a tool and tool-path determining unit 5, and an NC program generating unit 6. The NC hole-machining programming device 1 illustrated in FIG. 1 is composed of a microcomputer, and the pattern information storing unit 41 and the tool information storing unit 42 are both composed of memory of the microcomputer.

Figure 3:
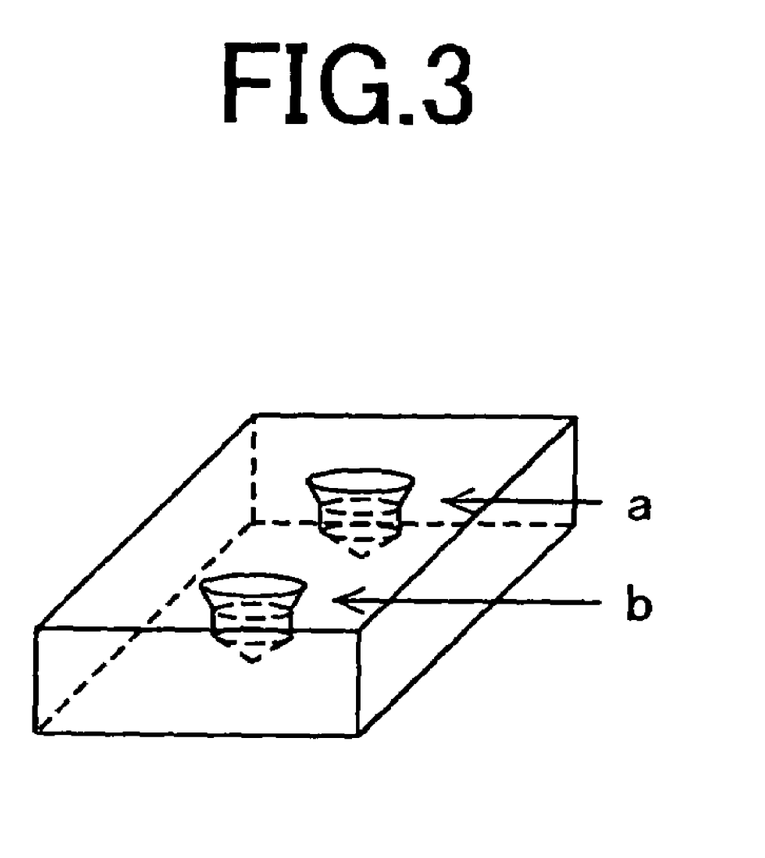
FIGS. 3 and 4 is diagrams illustrating examples of hole-machining forms.

The form recognizing unit 2 detects a machining form of a target object from three-dimensional CAD data 100, and identifies a hole-machining form based on the detected form. FIG. 3 is a diagram illustrating an example of the machining form of the target object detected by the form recognizing unit 2. The machining form illustrated in FIG. 3 includes two hole-machining forms indicated by "a" and "b". Each of the hole-machining form illustrated in FIG. 3 is composed of cylindrical surface and conical surfaces. The form recognizing unit 2 identifies each of the hole-machining form by extracting a cylindrical surface and a conical surface arranged coaxially. Hereinafter, the cylindrical surface or the conical surface, which constitutes the hole-machining form is referred to as a local geometry.

The CAD data 100 includes dimensions of the local geometry, or more specifically, internal diameter and depth of a cylindrical surface, and depth and apex angle of a conical surface, each of which constitutes hole-machining forms. The CAD data 100 also includes machining information of the local geometries such as a screw thread and a reamer.

The machining method determining unit 3 determines machining methods used for the hole-machining form detected by the form recognizing unit 2 by carrying out the following processing.

Figure 4:
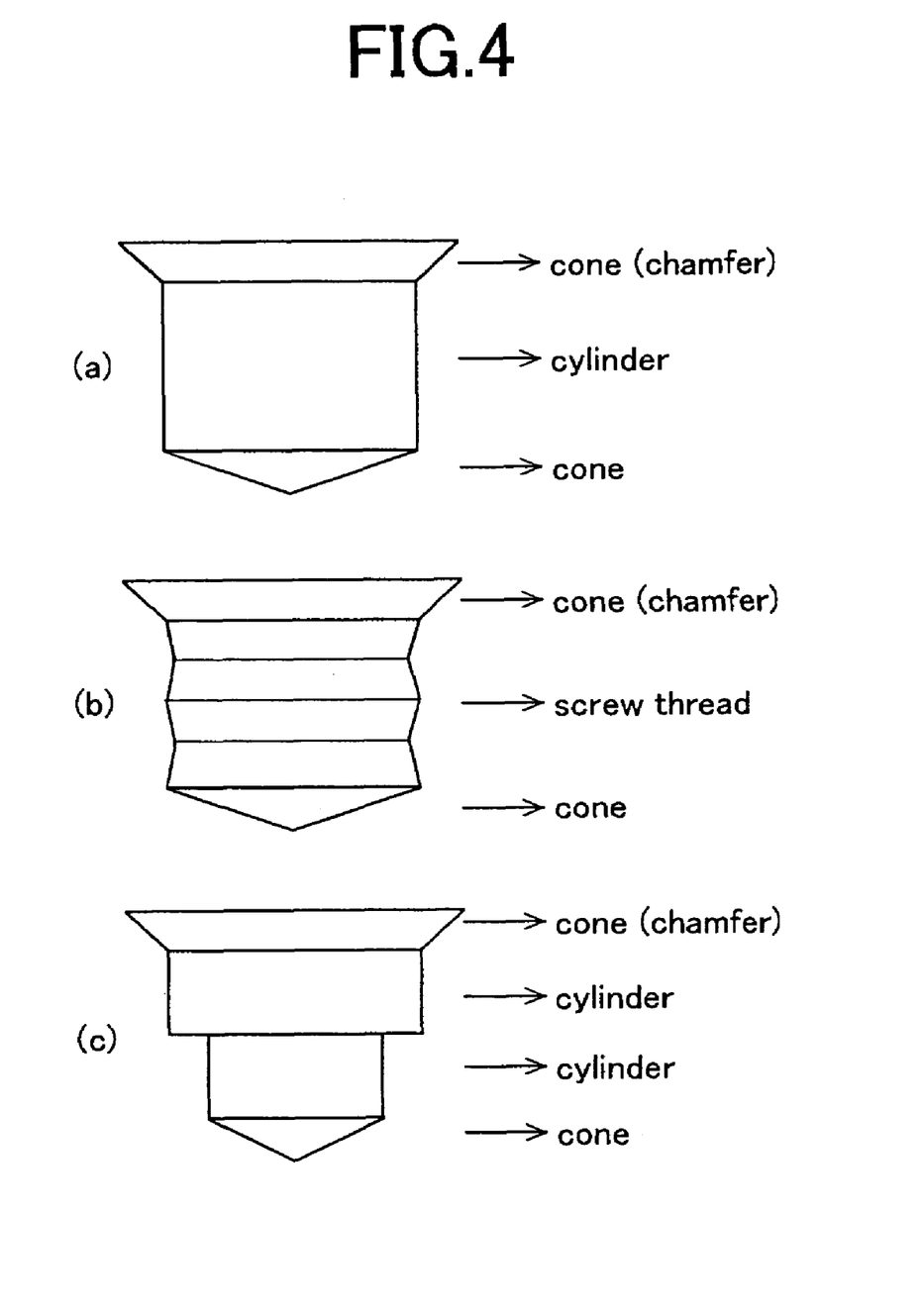

The machining method determining unit 3 firstly identifies features of the local geometry constituting the hole-machining form, extracted by the form recognizing unit 2. The local geometry having surface of a cone with apex angle 90° is recognized as a chamfer. FIG. 4 is a diagram illustrating examples of hole-machining forms composed of a plurality of local geometries. The local geometry of the hole-machining form illustrated in FIG. 4 (a) is detected from the top of the hole, and this hole-machining form is recognized as "cone (chamfer)—cylinder—cone". In the same manner, the hole-machining form illustrated in FIG. 4 (b) is recognized as "cone (chamfer)—cylinder (screw thread)—cone", and the hole-machining form illustrated in FIG. 4 (c) is recognized as "cone (chamfer)—cylinder—cylinder—cone".

Figure 5:
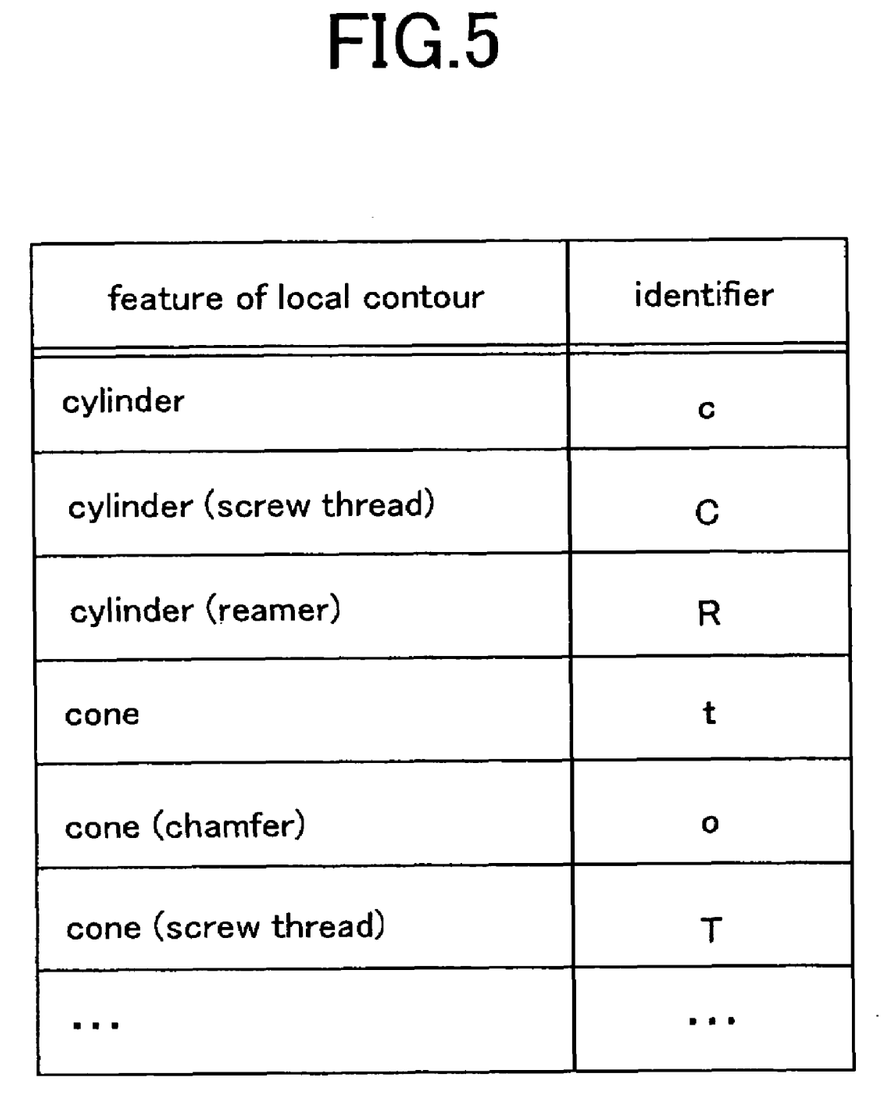
FIG. 5 is a diagram illustrating an identifier table.

The machining method determining unit 3 generates hole-machining-form patterns which indicates the recognized local geometries using identifiers. FIG. 5 is a diagram illustrating an identifier table storing the local geometries and corresponding identifiers. The identifier table illustrated in FIG. 5 is stored in the pattern information storing unit 41.

Figure 6:
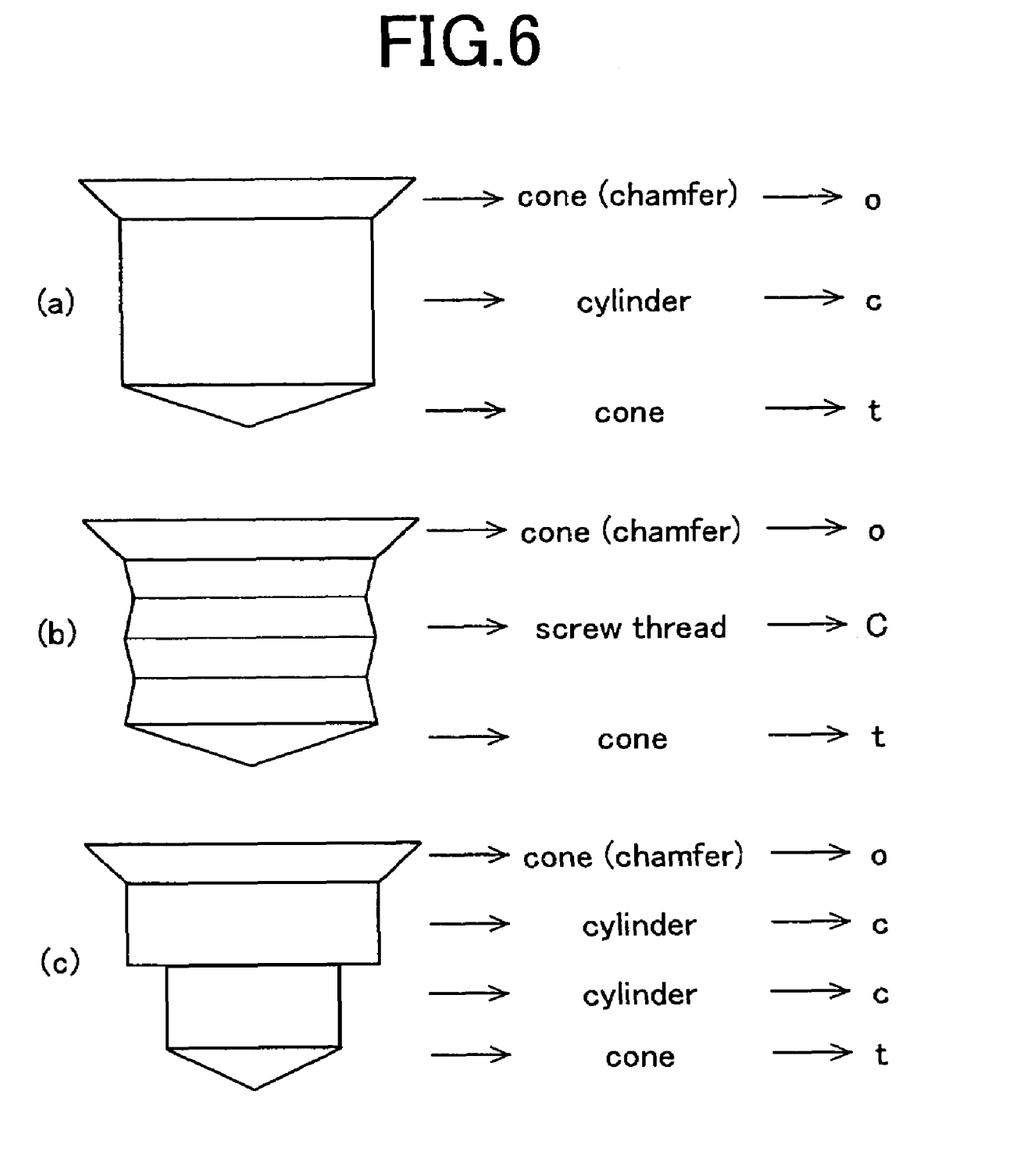
FIG. 6 is a diagram illustrating hole-machining-form patterns.

FIG. 6 is a diagram illustrating examples of hole-machining-form patterns. The hole-machining-form pattern illustrated in FIG. 6 (a) is represented as "oct"; the hole-machining-form pattern illustrated in FIG. 6 (b) is represented as "oCt"; and the hole-machining-form pattern illustrated in FIG. 6 (c) is represented as "occt". The hole-machining-form pattern is generated by combining each of the identifiers indicating the local geometries in the order of the detection (from top side to bottom side of the hole-machining form).

Figure 7:
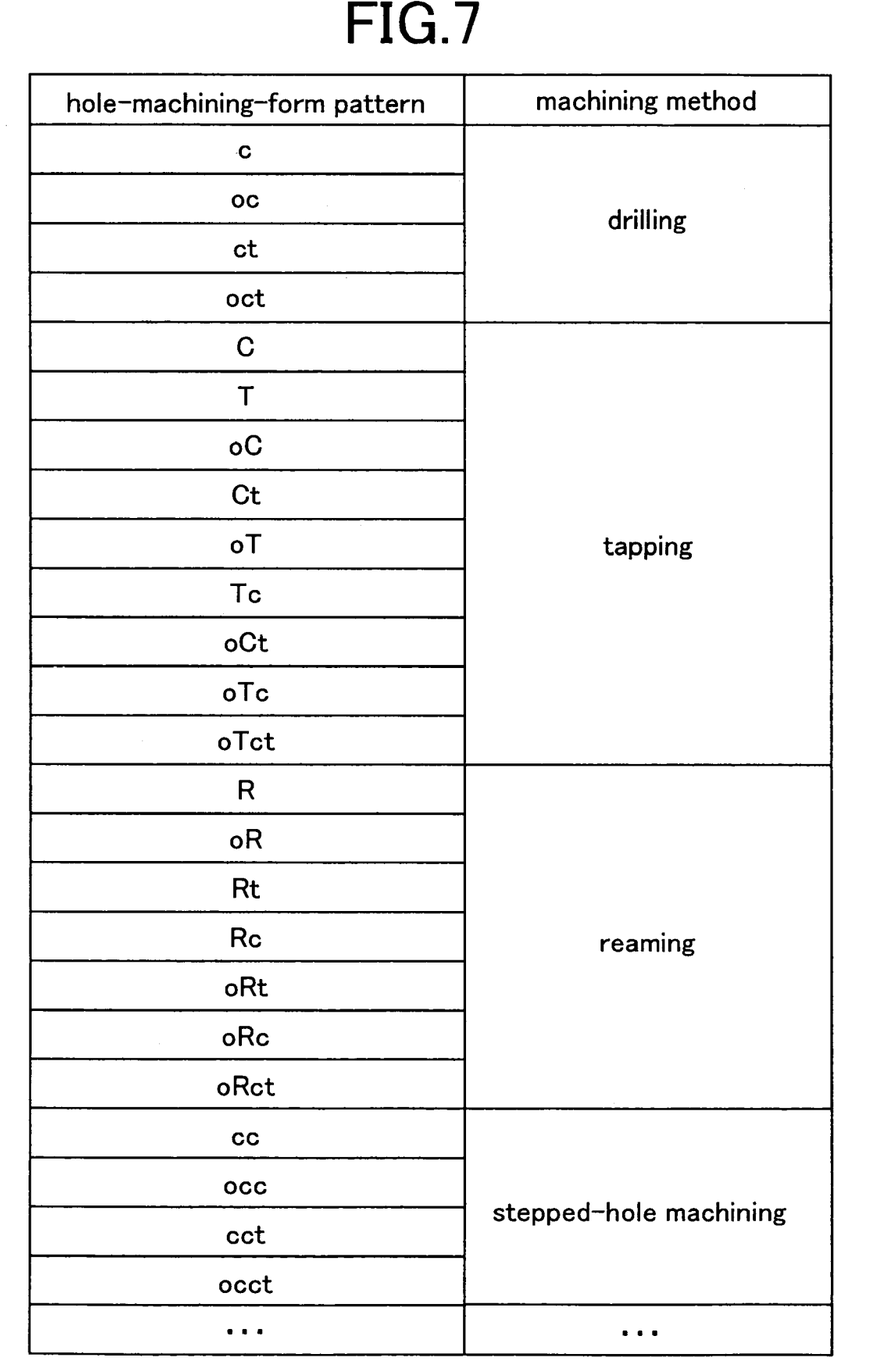
FIG. 7 is a diagram illustrating a machining method table.

The machining method determining unit 3 determines the machining method based on the hole-machining-form pattern. FIG. 7 is a diagram illustrating a machining method table storing the hole-machining-form patterns and corresponding machining methods. The machining method table illustrated in FIG. 7 is stored in the pattern information storing unit 41 together with the identifier table illustrated in FIG. 5. The machining method determining unit 3 refers to the machining method table (FIG. 7) to select the machining method corresponding to the hole-machining-form pattern.

Figure 8:
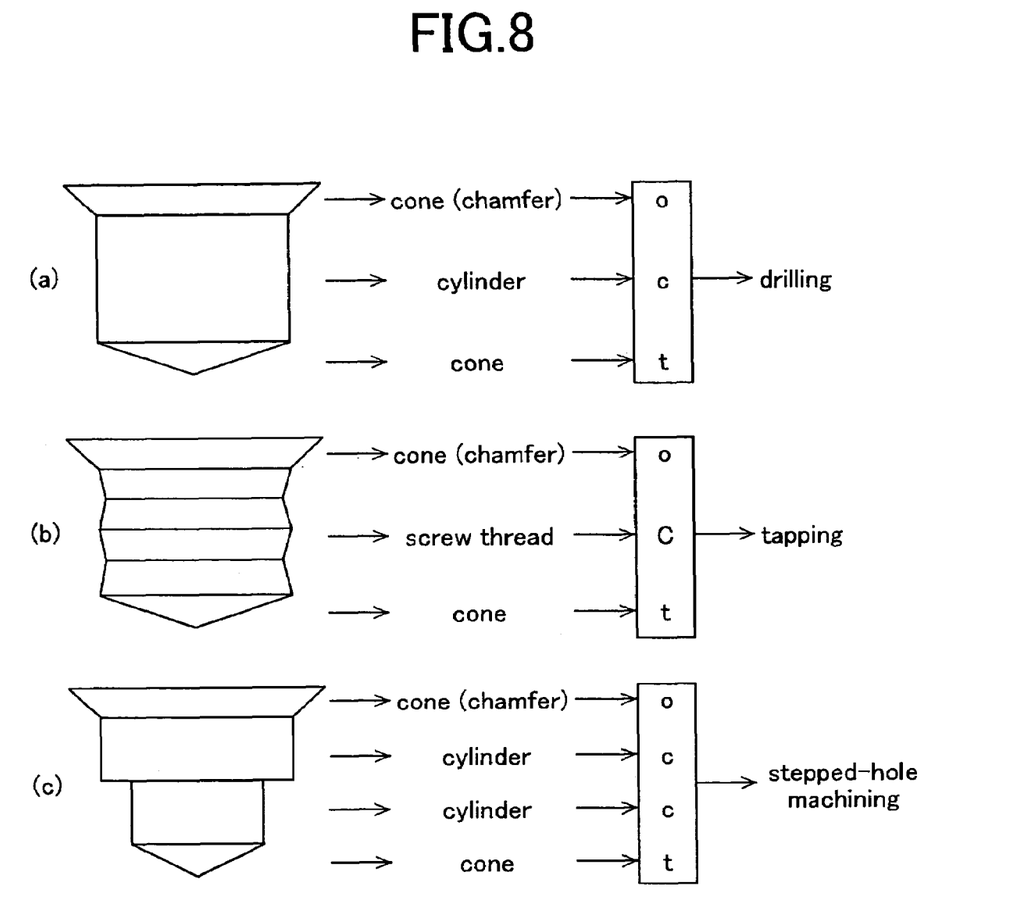
FIG. 8 is a diagram illustrating relations between hole-machining-form patterns and the machining methods.

FIG. 8 is a diagram illustrating relations between the hole-machining forms and the machining methods. Drilling is selected for the hole-machining form illustrated in FIG. 8 (a); tapping is selected for the hole-machining form illustrated in FIG. 8 (b); and stepped-hole machining is selected for the hole-machining form illustrated in FIG. 8 (c).

The tool and tool-path determining unit 5 selects tools required for machining based on the machining method determined by the machining method determining unit 3, and dimension of the hole-machining form (internal diameter and the depth of a cylinder, or depth and apex angle of a come) included in the CAD data, and determines paths for the selected tools.

The tools used for each machining method are predetermined. For example, a drilling tool is used for drilling, a drilling tool and a tapping tool are used for tapping; a drill and a reamer are used for reaming; and a drill, an end mill and the like are used for stepped-hole machining. In addition to these tools, a spotting tool used for positioning is added if required. Furthermore, when data indicating a cone with apex angle 90° is included in the three-dimensional CAD data 100, or when an identifier "o" indicating chamfering is included in the hole-machining-form pattern, a chamfering tool is added.

For instance, for the hole-machining form illustrated in FIG. 8 (a), a drilling tool and a chamfering tool are selected for drilling and chamfering. For the hole-machining form illustrated in FIG. 8 (b), a drilling tool, a tapping tool and a chamfering tool are selected for tapping and chamfering. For the hole-machining form illustrated in FIG. 8 (c), a drilling tool, an end milling tool and a chamfering tool are selected for stepped-hole machining and chamfering.

Determination of the machining method by the machining method determining unit 3 and selection of tools and determination of the tool path for the tool selected by the tool and tool-path determining unit 5 are performed for every hole-machining form extracted by the form recognizing unit 2. The tool path for a plurality of holes having the same finishing form is determined so that continuous machining is performed using a common tool.

The NC program generating unit 6 creates a series of NC programs based on the tool information and the tool path obtained by the tool and tool-path determining unit 5, and outputs the programs to a control unit of an NC machine tool 200. At the same time, Various control data such as designation of a tool rotational frequency and commands for fast feeding of the tool is added to the NC programs.

Figure 2:
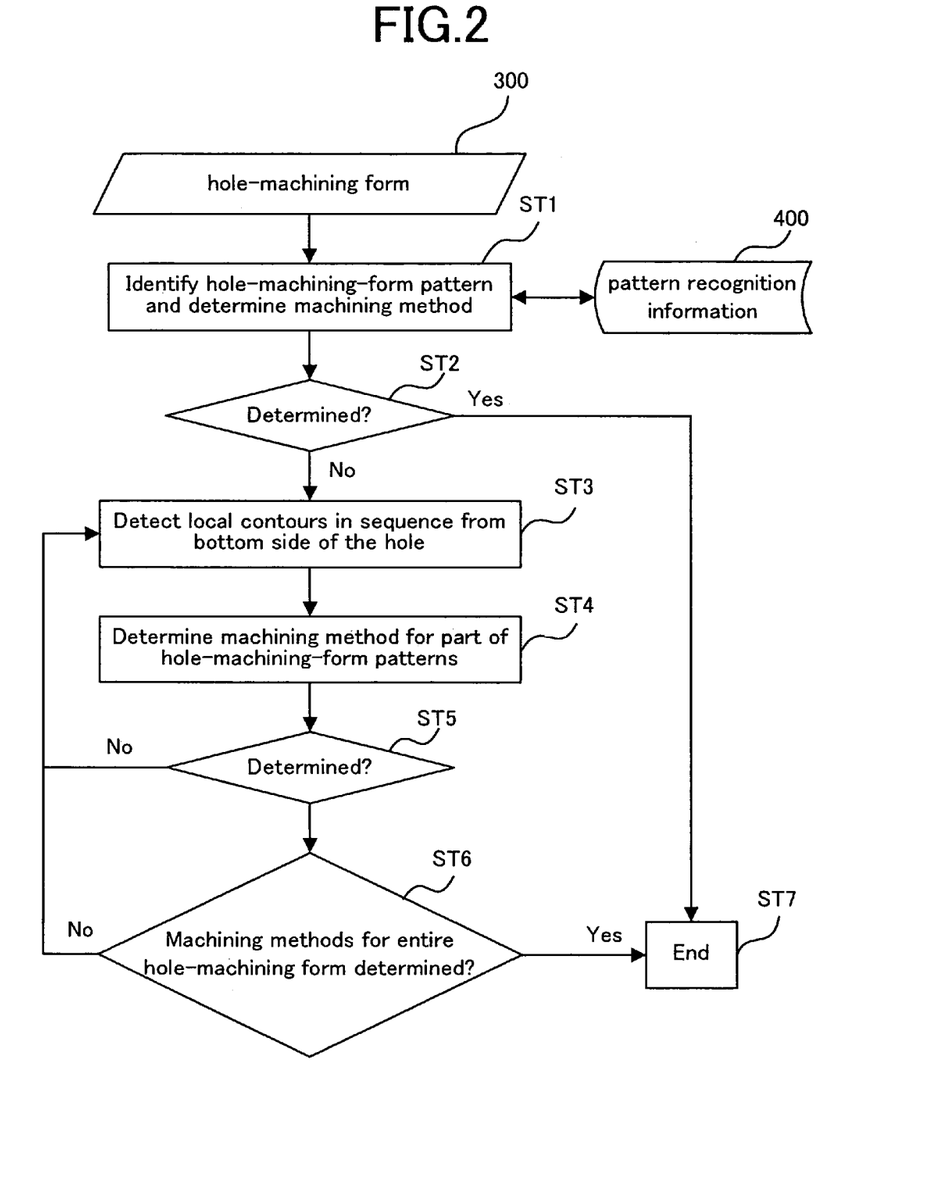
FIG. 2 is a flowchart illustrating steps for determining machining methods.

FIG. 2 is a flowchart illustrating a series of processing steps in the machining method determining unit 3. As described above, the machining method determining unit 3 refers to the machining method table (FIG. 7) stored in the pattern information storing unit 41, and determines the machining method for the hole-machining form 300 identified by the form recognizing unit 2 (step ST1). Then, whether the machining method has been determined is judged (step ST2). If the machining method has been determined, then the process is terminated (step ST7). Meanwhile, if the hole-machining form is too complicated to determine the machining method, the procedures of step ST3 through step ST6 are performed. More specifically, the local geometries are detected from the bottom side of the hole (step ST3), and the machining method corresponding to the detected local geometry is determined (step ST4). Then, whether the machining method has been determined is judged (step ST5). If the machining method cannot be determined, the process of step ST3 is repeated. If the machining method has been determined, whether the machining method for the entire hole-machining form has been determined is judged (step ST6).

Figure 9:
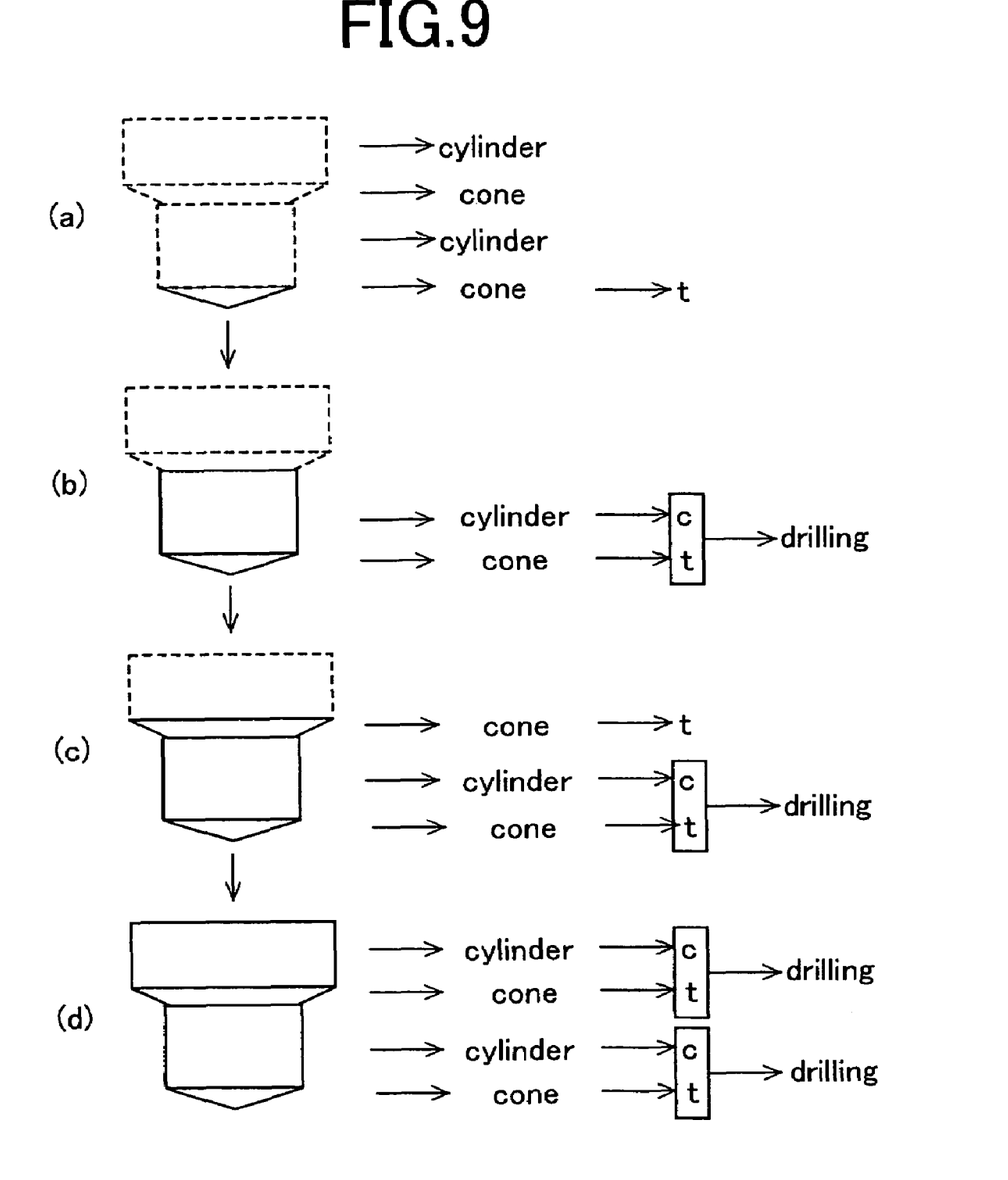
FIG. 9 is a diagram illustrating relations between the hole-machining-form patterns and the machining methods.

FIG. 9 is a diagram for explaining processing steps for determining the machining method for a complicated hole-machining f orm.

The identifier "t" is given to the local geometry of the bottom-side cone illustrated in FIG. 9 (a) (step ST3). However, since the hole-machining-form pattern "t" is not included in the machining method table (FIG. 7), the machining method cannot be determined in step ST4. Accordingly, the judgment in step ST5 is "No", and the process of step ST3 is repeated. In step ST3, as illustrated in FIG. 9 (b), the cylindrical surface "c" is detected as a next local geometry, and the hole-machining-form pattern "ct" is obtained. For the hole-machining-form pattern "ct", drilling is selected based on the machining method table (step ST4). Accordingly, the judgment in step ST5 is "Yes", and the process of step ST6 is performed. In step ST6, whether the machining methods for the entire hole-machining form have been determined is judged. In this case, the judgment result is "No", so the process of step ST3 is repeated, and the rest of the local geometries are detected in the same manner. More specifically, as illustrated in FIG. 9 (c), a cone "t" is detected as a next local geometry, and the hole-machining-form pattern "t" is obtained (step ST3). However, since the hole-machining-form pattern "t" is not included in the machining method table, the machining method cannot be determined in step ST4. Accordingly, the judgment in step ST5 is "No", and step ST3 is repeated. In step ST3, as illustrated in FIG. 9 (d), the cylindrical surface "c" is detected as a next local geometry, and the hole-machining-form pattern "ct" is obtained. For the hole-machining-form pattern "ct", drilling is selected based on the machining method table (step ST4). Accordingly, the judgments in step ST5 and step ST6 are "Yes", and the processing is terminated. Consequently, the hole-machining form in FIG. 9 is divided into two hole-machining form with different diameters and lengths, each of which is composed of a cylinder and a cone, and drilling using different drilling tools is selected for each of the portions.

As illustrated in FIG. 9, a plurality of hole-machining-form patterns constituting a single hole-machining form is generated, and a machining method is determined for each of the generated hole-machining-form patterns, whereby machining methods can be determined for complicated hole-machining forms.

In addition, the machining methods can be determined by detecting the hole-machining-form pattern of the local geometry from the top-face side of the hole.

In the above description, the local geometries having surface of a cone with apex angle 90° is considered as a chamfer. However, the surface of a cone with apex angle other than 90° may also be considered as a chamfer. Characters other than alphabet may be used as the identifiers indicating the local geometry, and the hole-machining-form patterns may be represented without using identifiers.

As described above, the NC hole-machining programming device according to this present invention includes:

a tool information storing unit which stores tool information including types and sizes of all tools attachable for hole machining;

a form recognizing unit which detects a hole-machining form based on the CAD data and extract a cylindrical surface or a conical surface included in the hole-machining form;

a machining method determining unit which generates a hole-machining-form pattern based on the hole-machining form detected by the form recognizing unit and determine machining methods based on the hole-machining-form patterns;

a tool determining unit which selects a tool in accordance with the machining methods determined by the machining method determining unit with reference to the tool information;

a tool path determining unit which determines a tool path for each tool selected by the tool determining unit; and an NC program generating unit which generates a series of NC programs, based on the tool paths determined by the tool path determining unit. Therefore, various hole machining such as tapping and stepped-hole machining, as well as drilling or reaming can be handled with the NC hole-machining programming device according to this invention.

Furthermore, the machining method determining unit repeats a following process for a hole-machining form having with a complicated shape: obtaining the hole-machining-form pattern for a portion of the hole-machining form and determining a machining method for that portion, and then determining a machining method for the hole-machining form as a combination of a plurality of machining methods. By repeating this process, a complicated hole-machining form can be handled.

What is claimed is:

1. A numerical control (NC) hole-machining programming device which generates an NC program for hole machining from three-dimensional CAD data which describe the completed form of a target object, the device comprising:

a tool information storing unit for storing tool information, including types and sizes of tools used, for hole machining;

a form recognizing unit for recognizing each of a plurality of hole-machining forms by detecting cylindrical shapes and conical shapes as local geometries from the three-dimensional CAD data;

a pattern information storing unit for storing pattern recognition information preliminarily describing hole-machining-form patterns corresponding to each hole-machining form and corresponding machining methods, the hole-machining-form patterns being represented by an identifier corresponding to cylindrical shapes detected and conical shapes detected as local geometries of a target object;

a machining method determining unit for determining the machining method depending on one of the hole-machining-form patterns and indicating the local geometries detected as represented by the rows of the identifiers, and the corresponding machining methods a tool determining unit for selecting a tool in accordance with the machining methods determined by the machining method determining unit with reference to the tool information;

a tool path determining unit which determines a tool path for each tool selected by the tool determining unit; and an NC program generating unit which generates an NC program based on the tool paths determined by the tool path determining unit.

2. The NC hole-machining programming device according to claim 1, wherein the three-dimensional CAD data includes dimensions of the local geometries and data related to machining of the local geometries;

the machining method determining unit distinguishes the feature using the three-dimensional CAD data and determines the machining methods based on the three-dimensional CAD data related to machining of the local geometries; and the tool determining unit selects the tool in accordance with the machining methods determined by the machining method determining unit and with the dimensions of the local geometries.

3. The NC hole-machining programming device according to claim 1, wherein the machining method determining unit generates a plurality of hole-machining-form patterns constituting a single hole-machining form, and determines a machining method for each of the hole-machining-form patterns generated when the hole-machining-form pattern is not included in the pattern recognition information that is stored.

4. A numerical control (NC) hole-machining programming method for generating an NC program for hole machining from three-dimensional CAD data which describe the completed form of a target object, the method comprising:

storing tool information, including types and sizes of tools used, for hole machining;

recognizing each of a plurality of hole-machining forms by detecting cylindrical shapes and conical shapes as local geometries from the three-dimensional CAD data;

storing pattern recognition information preliminarily describing corresponding hole-machining-form patterns based on each hole-machining form and corresponding machining methods, the hole-machining-form patterns being represented by an identifier corresponding to cylindrical shapes detected and conical shapes detected as local geometries of a target object;

determining the machining method depending on one of the hole-machining-form patterns and indicating the local geometries recognized as represented by the identifiers, and the corresponding machining methods;

selecting a tool in accordance with the machining methods determined with reference to the tool information;

determining a tool path for each tool selected; and generating an NC program based on the tool paths determined.

5. The NC hole-machining programming method according to claim 4, wherein the three-dimensional CAD data includes dimensions of the local geometries and data related to machining of the local geometries, and including distinguishing the feature using the three-dimensional CAD data and determining the machining methods based on the three-dimensional CAD data related to machining of the local geometries; and selecting the tool in accordance with the machining methods determined and with the dimensions of the local geometries.

6. The NC hole-machining programming method according to claim 4, including generating a plurality of hole-machining-form patterns constituting a single hole-machining form, and determining a machining method for each of the hole-machining-form patterns generated when the hole-machining-form pattern is not included in the pattern recognition information that is stored.

* * * * *